(12) United States Patent
Xu

(10) Patent No.: US 11,019,474 B2
(45) Date of Patent: May 25, 2021

(54) BLUETOOTH RECEIVING METHOD, BLUETOOTH RECEIVER, AND BLUETOOTH AUDIO DEVICE

(71) Applicant: ZGMICRO NANJING LTD, Jiangsu (CN)

(72) Inventor: Bin Xu, Jiangsu (CN)

(73) Assignee: Zgmicro Nanjing Ltd., Jiangsu (CN)

( * ) Notice: Subject to any disclaimer, the term of this patent is extended or adjusted under 35 U.S.C. 154(b) by 42 days.

(21) Appl. No.: 16/440,234

(22) Filed: Jun. 13, 2019

(65) Prior Publication Data

US 2019/0394627 A1    Dec. 26, 2019

(51) Int. Cl.
  *H04W 4/80* (2018.01)
  *H04L 1/00* (2006.01)
  *H04L 1/16* (2006.01)
  *H04L 1/20* (2006.01)
  *H04B 1/16* (2006.01)

(52) U.S. Cl.
  CPC .............. *H04W 4/80* (2018.02); *H04B 1/16* (2013.01); *H04L 1/0061* (2013.01); *H04L 1/1607* (2013.01); *H04L 1/20* (2013.01)

(58) Field of Classification Search
  CPC ... H04B 1/06; H04B 1/08; H04B 1/10; H04B 1/1027; H04B 1/16; H04L 1/0036; H04L 1/0045; H04L 1/0047; H04L 1/0061; H04L 1/1607; H04L 1/20; H04W 4/80
  USPC ....... 375/316, 324, 340, 341; 455/21, 67.13, 455/226.1, 226.2
  See application file for complete search history.

(56) References Cited

U.S. PATENT DOCUMENTS

| | | | |
|---|---|---|---|
| 8,565,255 B1 * | 10/2013 | Tang ..................... | H04W 24/00 370/338 |
| 2003/0129978 A1 * | 7/2003 | Akiyama ................. | H04B 3/54 455/426.1 |
| 2007/0021091 A1 * | 1/2007 | Trankle .................. | H04B 1/109 455/337 |
| 2008/0004064 A1 * | 1/2008 | Sakurai ................. | H04W 52/06 455/522 |
| 2009/0052584 A1 * | 2/2009 | Cairns ...................... | H04L 1/20 375/340 |
| 2013/0343576 A1 * | 12/2013 | Pahuja ................... | H04H 40/36 381/119 |

* cited by examiner

*Primary Examiner* — Young T. Tse
(74) *Attorney, Agent, or Firm* — Joe Zheng

(57) ABSTRACT

A Bluetooth receiving method, a Bluetooth receiver, and a Bluetooth audio device are disclosed in the present invention. The Bluetooth receiving method includes: obtaining load data and a CRC result of the load data, and processing the load data based on signal quality of each of a plurality of data segments in one or more pre-stored load data having failed CRC results when the CRC result of the load data fails and a remaining retransmission time for the load data is no longer available. The signal quality is determined based on a signal angle difference before and after judgment for each of the plurality of data segments in each load data during demodulation. By using solutions provided in the present invention, damage caused by a data loss to a voice or audio can be concealed, and data reliability of limited retransmission of Bluetooth can be effectively improved, thereby improving Bluetooth communication performance.

13 Claims, 3 Drawing Sheets

BLUETOOTH RECEIVING METHOD, BLUETOOTH RECEIVER, AND BLUETOOTH AUDIO DEVICE

BACKGROUND OF THE INVENTION

Field of the Invention

The present invention generally relates to the field of communications technologies, and more particularly relates to Bluetooth receiving methods, Bluetooth receivers and Bluetooth audio devices.

Description of the Related Art

Extensive developments of Bluetooth technologies are enabling Bluetooth products and services to become part of daily life. In particular, voice or audio applications on a Bluetooth audio device, such as a Bluetooth headset, a Bluetooth speaker, or an in-vehicle hands-free device, provide great convenience to people's life.

The requirements on voice and audio performance, communication distance, or communication reliability are equally becoming higher. Any disadvantages in the Bluetooth technologies designed with low costs and low power consumption are becoming more apparent in terms of communication performance and reliability. Currently, a transmission technology without error correction coding and an automatic retransmission mechanism that is based on cyclic redundancy check (CRC) are often used for Bluetooth voice and audio transmission. A limited retransmission mechanism without error correction coding based on the CRC is used for both a classic Bluetooth voice channel (extended synchronous connection-oriented or eSCO) and voice/audio transmission based on Bluetooth low energy (BLE) isochronous channels that may be added in the future standard.

With the foregoing Bluetooth transmission technology, data transmission fails within a limited time window, namely, loss of some or all data because the time for retransmission is limited. Therefore, a packet loss concealment (PLC) technology is used in practice to conceal the damage caused by a data loss to a voice or audio.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of Bluetooth-related products and technologies. According to one aspect of the present, a Bluetooth receiving method, a Bluetooth receiver, and a Bluetooth audio device are provided to conceal damages caused by a data loss to a voice or audio. A Bluetooth receiving method, a Bluetooth receiver, and a Bluetooth audio device are disclosed in the present invention. The Bluetooth receiving method includes: obtaining load data and a CRC result of the load data, and processing the load data based on signal quality of each of a plurality of data segments in one or more pre-stored load data having failed CRC results when the CRC result of the load data fails and a remaining retransmission time for the load data is no longer available. The signal quality is determined based on a signal angle difference before and after judgment for each of the plurality of data segments in each load data during demodulation. By using solutions provided in the present invention, damage caused by a data loss to a voice or audio can be concealed, and data reliability of limited retransmission of Bluetooth can be effectively improved, thereby improving Bluetooth communication performance.

In the Bluetooth receiving method, the Bluetooth receiver, and the Bluetooth audio device provided in the present invention, when the CRC result is failed and the remaining retransmission times for the load data runs out, the load data is processed based on signal quality of each of a plurality of data segments in one or more pre-stored load data having failed CRC results, to use the load data having failed CRC result and relatively good signal quality to conceal damage caused by a data loss to a voice or audio, thereby improving data reliability of limited retransmission of Bluetooth and Bluetooth communication performance effectively.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
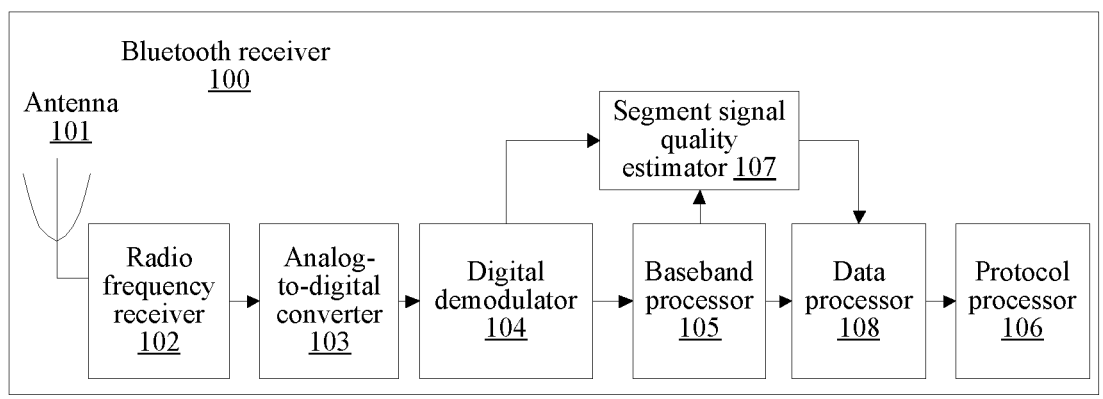
FIG. 1 is a schematic structural diagram of a Bluetooth receiver according to a first embodiment of the present invention.

The detailed description of the invention is presented largely in terms of procedures, operations, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Radio signal quality changes mainly due to impact of changing interference and fading in a wireless communications system. In a Bluetooth wireless communications system, each data packet is very short, a largest data packet does not exceed three milliseconds, and a moving rate of a Bluetooth device is extremely low. Impact of fading on each data packet may be ignored. Therefore, signal quality of a Bluetooth data packet changes mainly due to the impact of interference, particularly sudden interference in the 2.4 GHz frequency band.

An audio decoder is prone to consecutive incorrect data errors. For example, for a CVSD decoder, a jarring noise is caused if consecutive data bit errors exist in input data due to strong interference. Therefore, interfered consecutive incorrect data errors need to be prevented from being input into the audio decoder.

If a synchronization word and a packet header of the Bluetooth data packet are affected by interference, a packet loss is caused. To be specific, the synchronization fails or packet header detection fails. In an environment with interference, as whereabouts, feature, or error ratio of a data packet with incorrect CRC result cannot be obtained, the data packet with incorrect CRC result is usually processed as a lost packet. As a result, it is considered a huge data loss to process a data packet even with a small amount of incorrect data.

To overcome the foregoing technical problems, a Bluetooth receiving method, a Bluetooth receiver, and a Bluetooth audio device are described herein. According to one aspect of the present invention, when a CRC result is failed and a remaining retransmission times for load data runs out, the load data is processed based on signal quality of a data segment in one or more pre-stored load data having failed the CRC results, to use the load data having failed the CRC result and relatively good signal quality to conceal the damage caused by a data loss to a voice or audio, thereby effectively improving data reliability of limited retransmission of Bluetooth and Bluetooth communication performance.

In the Bluetooth receiving method provided in the present invention, signal quality of the load data of a data packet with correct synchronization, correct packet header detection, and incorrect CRC result is considered. It is assessed that whether consecutive bit data errors caused by sudden interference exist in the load data with incorrect CRC. If the consecutive bit data errors do not exist in the load data with incorrect CRC, it is determined that the load data can be still used for audio decoding.

First Embodiment

FIG. 1 is an exemplary schematic structural diagram of a Bluetooth receiver according to a first embodiment of the present invention. As shown in FIG. 1, the Bluetooth receiver 100 includes an antenna 101, a radio frequency receiver 102, an analog-to-digital converter (ADC) 103, a digital demodulator 104, a baseband processor 105, a protocol processor 106, a segment signal quality estimator 107 and a data processor 108. The segment signal quality estimator 107 and the data processor 108 are added in view of a traditional Bluetooth receiver. In one embodiment, the antenna 101, the radio frequency receiver 102, the analog-to-digital converter 103, the digital demodulator 104, the baseband processor 105 and the protocol processor 106 can all be implemented by using a conventional technology in the prior art which are not to be described in detail hereafter for simplicity.

In one embodiment, the protocol processor 106 sets a receive channel, a synchronization code, and a receiving time based on a frequency calculated by using a frequency hopping algorithm before the Bluetooth receiver 100 receives data. The antenna 101 is used for receiving a radio frequency signal. The radio frequency receiver 102 is responsible for converting the radio frequency signal into an analog baseband signal. The analog-to-digital converter 103 is responsible for converting the analog baseband signal into a digital baseband signal. The digital demodulator 104 is responsible for demodulating the digital baseband signal into digital baseband data, and transmitting data both before and after demodulation to the segment signal quality estimator 107. The baseband processor 105 is responsible for processing the digital baseband data, providing load data length to the segment signal quality estimator 107, and providing a CRC result to the digital processor 108. The baseband processor 105 delivers both data with correct CRC result and incorrect CRC result to the data processor 108 for processing.

The segment signal quality estimator 107 is configured to estimate signal quality of each data segment before and after demodulation, and provide the signal quality to the data processor 108. The data processor 108 processes data after limited retransmission based on the signal quality obtained by the segment signal quality estimator 107 to improve the reliability of baseband data, and delivers the processed data to the protocol processor 106 for further processing.

Figure 2:
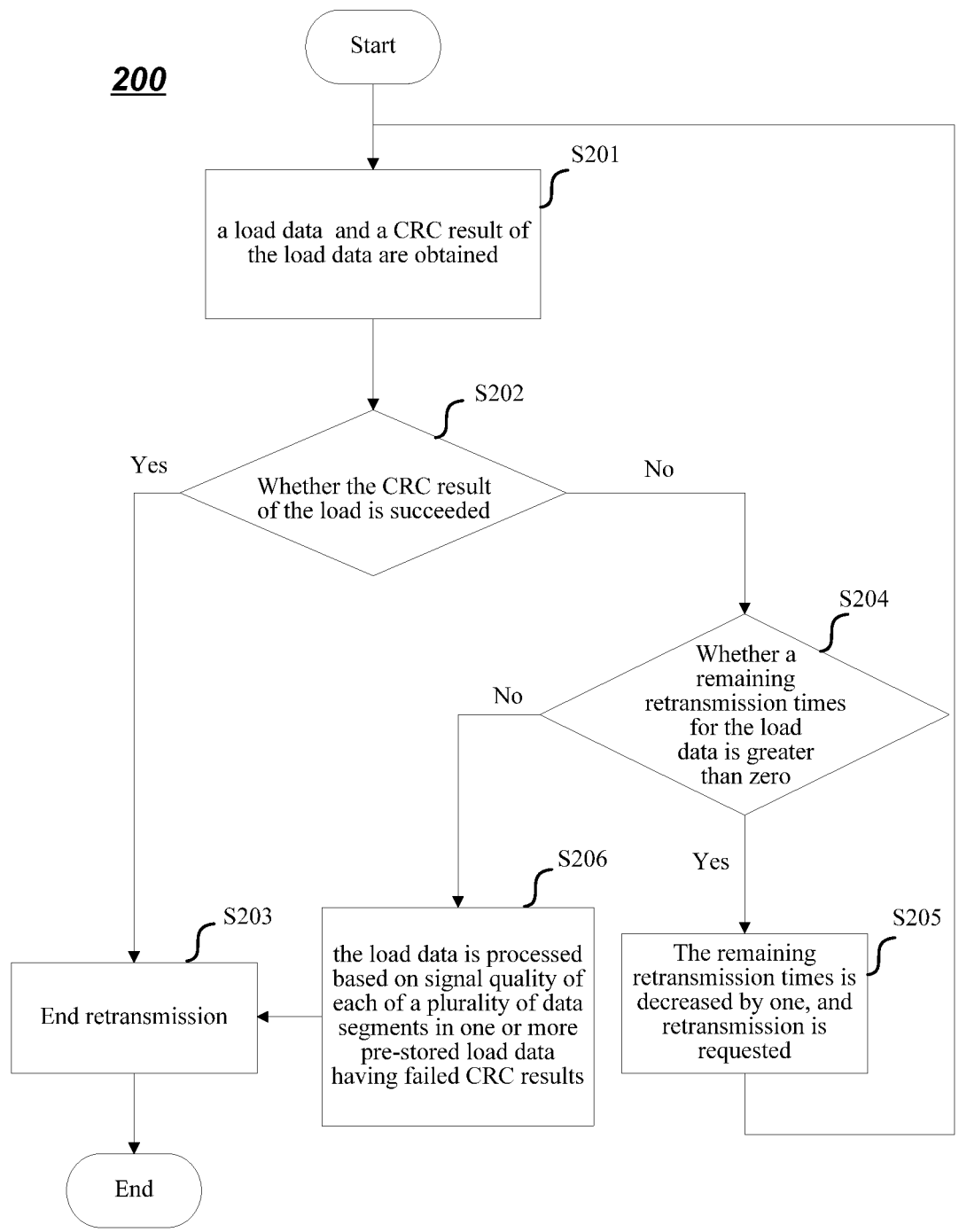
FIG. 2 is a flowchart showing a Bluetooth receiving method applied to a data processor in FIG. 1.

FIG. 2 is a flowchart showing a Bluetooth receiving method 300 applied to the data processor 108 in FIG. 1. As shown in FIG. 2, the Bluetooth receiving method 300 according to the first embodiment of the present invention includes the following operations.

S201: load data and a CRC result of the load data are obtained.

S202: whether the CRC result of the load data is succeeded is determined. When the CRC result is succeeded, the load data is transmitted to the protocol processor 106 for processing, and the method is led to S203 to end retransmission; otherwise, the method is led to S204.

By performing S201 to S203 repeatedly, the load data with succeeded CRC results may be transmitted to the protocol processor 106 that includes an audio decoder for subsequent processing.

S204: whether a remaining retransmission times for the load data is greater than zero is determined. When the remaining retransmission times is greater than zero, the method is led to S205; otherwise, the method is led to S206.

S205: the remaining retransmission times is decreased by one and retransmission is requested.

S206: the load data is processed based on signal quality of each of a plurality of data segments in one or more pre-stored load data having failed CRC results. The signal quality is determined based on a signal angle difference before and after judgment for each of the plurality of data segments in each load data during demodulation.

Depending on the implementation, before S206, the digital demodulator 104 may send the demodulation signal to the segment signal quality estimator 107, and the baseband processor 105 provides a length of the load data to the segment signal quality estimator 107, so that the segment signal quality estimator 107 may estimate signal quality of each data segment in the load data, and then the segment signal quality estimator 107 sends the signal quality of each data segment to the data processor 105.

In one embodiment, the segment signal quality estimator 107 may determine the signal quality of each data segment in the load data based on a signal angle difference before and after judgment for each of the plurality of data segments in each load data during demodulation.

In one embodiment, that the signal quality of each data segment in the load data is determined based on a signal angle difference before and after judgment for each of the plurality of data segments in each load data during demodulation may include: dividing the load data into N data segments each comprising M symbols based on a length of the load data, wherein M is a natural number greater than or equal to 1 and N is a natural number greater than 1; calculating a complex signal angle $\theta$ before judgment and a data angle $\hat{\theta}$ after judgment during demodulation for each symbol separately; calculating an absolute value $\Delta\theta=|\theta-\hat{\theta}|$ of a difference between the complex signal angle $\theta$ and the data angle $\hat{\theta}$ for each symbol; calculating $\overline{\Delta\theta}$ of each of the N data segments separately, wherein $\overline{\Delta\theta}$ is an average value of M $\Delta\theta$ corresponding to the M symbols in each data segment; and determining the signal quality of each data segment based on $\overline{\Delta\theta}$ of each data segment.

Depending on the implementation, N may be preset by a related person according to comprehensively considering a calculation amount and wanted data quality. Usually, a larger N indicates a larger calculation amount, but higher data quality after processing. If N is preset, M may be determined based on the length of the load data and N, e.g., M equals the length of the load data divided by N.

In another implementation, M may be preset, and the segment quantity N may be determined based on the length of the load data and the set length M of each data segment. E.g., N equals the length of the load data divided by M. For example, the length M of each data segment is set to 10, in other words, each data segment includes 10 symbols. When the length of the load data is 100 symbols, N=100/10=10. When the length of the load data is 80 symbols, N=80/10=8. This is not limited in the present invention.

Depending on the implementation, the complex signal angle $\theta$ before judgment and the data angle $\hat{\theta}$ after judgment during demodulation for each symbol may be obtained by using a traditional technical way of a person skilled in the art. Details are not described herein for simplicity.

Depending on the implementation, determining the signal quality of each data segment based on $\overline{\Delta\theta}$ of each data segment may include: determining that the signal quality of the data segment is a first state if $\overline{\Delta\theta}$ of the data segment is less than or equal to a preset threshold, otherwise, determining that the signal quality of the data segment is a second state. For example, the first state may be normal or usable, and the second state may be unusual, abnormal, or unusable. The preset threshold may be set to a value, such as 5 degrees, 8 degrees, or 10 degrees.

Depending on the implementation, to increase processing speed, the operation of estimating signal quality of each data segment in the load data performed by the segment signal quality estimator 107 may be performed in parallel with the operations of S201 to S205 performed by the data processor 105. Certainly, they may be alternatively not performed in parallel. For example, the operation of estimating the signal quality may be performed before or after any operation in S201 to S205. This is not limited in the present invention.

Depending on the implementation, the segment signal quality estimator 107 may estimate signal quality of each load data that is received, or may estimate signal quality of the load data having failed CRC result only. This is not limited in the present invention.

Depending on the implementation, the segment signal quality estimator 107 may transmit the obtained signal quality, corresponding load data, and the CRC result to the data processor 105, or may transmit only signal quality to the data processor 108. All implementations in which the data processor can distinguish signal quality of each data segment in each load data fall within the protection scope of the present invention. This is not limited in the present invention.

In one embodiment of S206, when there is one pre-stored load data, that the load data is processed based on signal quality of each of a plurality of data segments in one or more pre-stored load data having failed CRC results include: transmitting, to the protocol processor 106, the data segment of which the signal quality is the first state in the one pre-stored load data having failed CRC result; and discarding the data segment of which the signal quality is the second state in the one pre-stored load data.

In some cases, for example, when there is a serious packet loss, if only one data packet having failed CRC result is received after a plurality of times of retransmission. Whether each data segment is correct may be determined based on an average value $\overline{\Delta\theta}$ of absolute values of angle differences corresponding to each data segment provided by the segment signal quality estimator 107. If each data segment is correct, it may be considered that the load data is not seriously interfered and affected, and the load data is sent to the audio decoder for decoding. On the contrary, the data segment is discarded, and processing for a packet loss is performed, or the audio decoder is instructed to perform PLC processing.

In another embodiment of S206, when there is a plurality of pre-stored load data having failed CRC result, that the load data is processed based on signal quality of each of a plurality of data segments in one or more pre-stored load data having failed CRC results includes: selecting N data segments having minimum $\overline{\Delta\theta}$ from corresponding data segments in the pre-stored load data respectively, and combining the N data segments having minimum $\overline{\Delta\theta}$ into one new combined load data; transmitting, to a protocol processor 106, the data segment of which the signal quality is the first state in the new combined load data; and discarding the data segment of which the signal quality is the second state in the new combined load data.

When there are two or more data packets with failed CRC results, data with optimal quality in each data segment corresponding to the plurality of data packets. Namely, data whose average value $\overline{\Delta\theta}$ of absolute values of angle differences corresponding to each data segment is the minimum may be selected to form a new data packet. Then, whether each data segment in the new data packet is correct is determined. If signal quality of each data segment in the new data packet is not seriously interfered and affected, the new data packet is sent to the audio decoder for decoding. On the contrary, the new data packet is processed as a lost packet, or the audio decoder is instructed to perform PLC processing. In other words, after a plurality of load data with failed CRC result is segmented, data segments with optimal signal quality are combined into a new combined load data with high signal quality, and signal quality of each data segment in the new combined load data is further estimated. Whether consecutive bit data errors caused by sudden interference exist in the new combined load data is estimated. If the consecutive bit data errors do not exist, it indicates that the new combined load data may be used for audio decoding.

It should be understood that, the method may include an operation of storing the load data having failed CRC result before S206. The storing operation may be performed after S201. The storing operation may also be performed after S202 and before S204. The storing operation may also be performed after S204 and before S206 or S205. This is not limited in the present invention.

In the Bluetooth receiving method of the present invention, the data processor 108 receives the load data firstly, and then determines whether the CRC result is succeeded within the retransmission times. If the CRC result is succeeded, the retransmission is ended, and the load data having succeeded CRC result is sent to the protocol processor 106 for further processing or audio decoding. If there is no load data having succeeded CRC result after the retransmission times is zero, the stored load data having failed CRC result is further processed.

In the Bluetooth receiving method of the present invention, when the CRC result is failed and the remaining retransmission times for the load data runs out, the load data is processed based on signal quality of each of a plurality of data segments in one or more pre-stored load data having failed CRC results, to use the load data having failed CRC result and relatively good signal quality to conceal damage caused by a data loss to a voice or audio, thereby effectively improving data reliability of limited retransmission of Bluetooth and Bluetooth communication performance.

Second Embodiment

Figure 3:
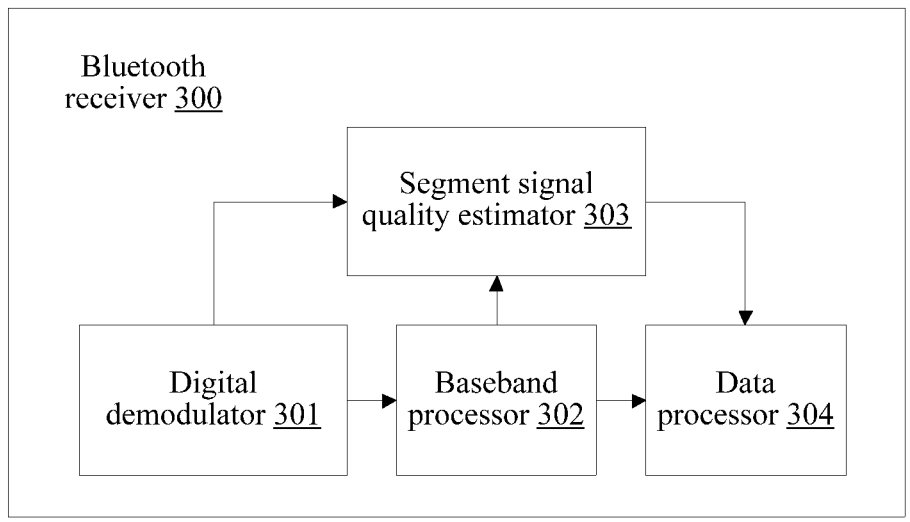
FIG. 3 is a schematic structural diagram of the Bluetooth receiver according to a second embodiment of the present invention.
Figure 3:
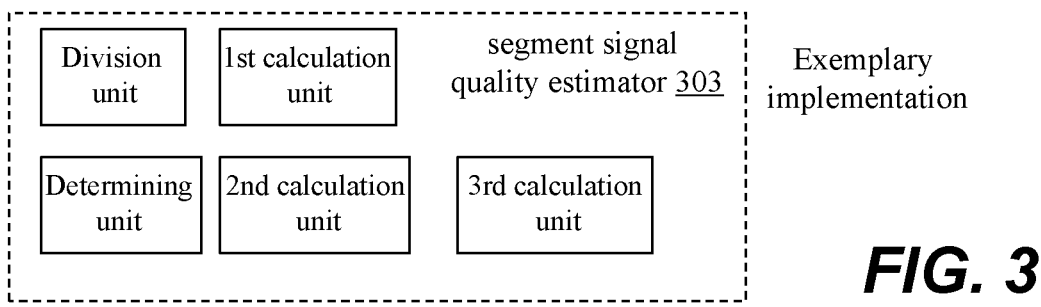

Based on a same invention conception, the Bluetooth receiver is provided according to a second embodiment of the present invention. FIG. 3 is a schematic structural diagram of the Bluetooth receiver according to the second embodiment of the present invention. As shown in FIG. 3, the Bluetooth receiver 300 includes at least a digital demodulator 301, a baseband processor 302, a segment signal quality estimator 303 and a data processor 304. The digital demodulator 301 refers to the digital demodulator 104 in the first embodiment of the present invention. Repeated content is not described here for simplicity. The baseband processor 302 is configured to receive a baseband signal from the digital demodulator, and parse out load data and CRC information of the load data; and obtain a CRC result of the load data based on the CRC information. The baseband processor 302 refers to the baseband processor 105 in the first embodiment of the present invention. Repeated content is not described here for simplicity. The segment signal quality estimator 303 is configured to obtain a signal angle difference before and after judgment for each data segment in each load data from the digital demodulator; and determine signal quality of each data segment in the load data based on the signal angle difference before and after judgment for each data segment in each load data during demodulation.

The segment signal quality estimator 303 refers to the segment signal quality estimator 107 in the first embodiment of the present invention. Repeated content is not described here for simplicity. The data processor 304 is configured to obtain the load data and the CRC result of the load data from the baseband processor; process the load data based on signal quality of each data segment in one or more pre-stored load data having failed CRC results when the CRC result of the load data is failed, and a remaining retransmission times for the load data is not greater than zero. The data processor 304 refers to the data processor 108 in the first embodiment of the present invention. Repeated content is not described here for simplicity.

Depending on the implementation, the data processor may be further configured to transmit the load data to a protocol processor for processing and end retransmission when the CRC result of the load data is succeeded.

Depending on the implementation, the data processor may be further configured to decrease the remaining retransmission times by one, and request retransmission when the CRC result of the load data is failed and the remaining retransmission times for the load data is greater than zero.

Depending on the implementation, the segment signal quality estimator may include: a division unit, configured to divide the load data into N segments each comprising M symbols based on a length of the load data, wherein M is a natural number greater than or equal to 1 and N is a natural number greater than 1; a first calculation unit, configured to calculate a complex signal angle $\theta$ before judgment and a data angle $\hat{\theta}$ after judgment during demodulation for each symbol separately; a second calculation unit, configured to calculate an absolute value $\Delta\theta=|\theta-\hat{\theta}|$ of a difference between the complex signal angle $\theta$ and the data angle $\hat{\theta}$ for each symbol; a third calculation unit, configured to calculate $\overline{\Delta\theta}$ of each of the N data segments separately, wherein $\overline{\Delta\theta}$ is an average value of M $\Delta\theta$ corresponding to the M symbols in each data segment; and a first determining unit, configured to determine the signal quality of each data segment based on $\overline{\Delta\theta}$ of each data segment.

Depending on the implementation, the first determining unit is configured to determine that the signal quality of the data segment is a first state if the signal quality $\overline{\Delta\theta}$ of the data segment is less than or equal to a preset threshold, otherwise, determine that the signal quality of the data segment is a second state.

Depending on the implementation, when there is one pre-stored load data, the data processor is configured to: transmit, to a protocol processor, the data segment of which the signal quality is the first state in the one pre-stored load data having failed CRC result; and discard the data segment of which the signal quality is the second state in the one pre-stored load data.

Depending on the implementation, when there is a plurality of pre-stored load data, the data processor is specifically configured to: select data segments having minimum $\overline{\Delta\theta}$ respectively from N corresponding data segments in the pre-stored load data having failed CRC results, and combine the N data segments having minimum $\overline{\Delta\theta}$ into one new combined load data; transmit, to a protocol processor, the data segment of which the signal quality is the first state in the new combined load data; and discard the data segment of which the signal quality is the second state in the new combined load data.

In the Bluetooth receiver according to the second embodiment of the present invention, when the CRC result is failed and the remaining retransmission times for the load data runs out, the load data is processed based on signal quality of each of a plurality of data segments in one or more pre-stored load data having failed CRC results, to use the load data having failed CRC result and relatively good signal quality to conceal damage caused by a data loss to a voice or audio, thereby effectively improving data reliability of limited retransmission of Bluetooth and Bluetooth communication performance.

Third Embodiment

Figure 4:
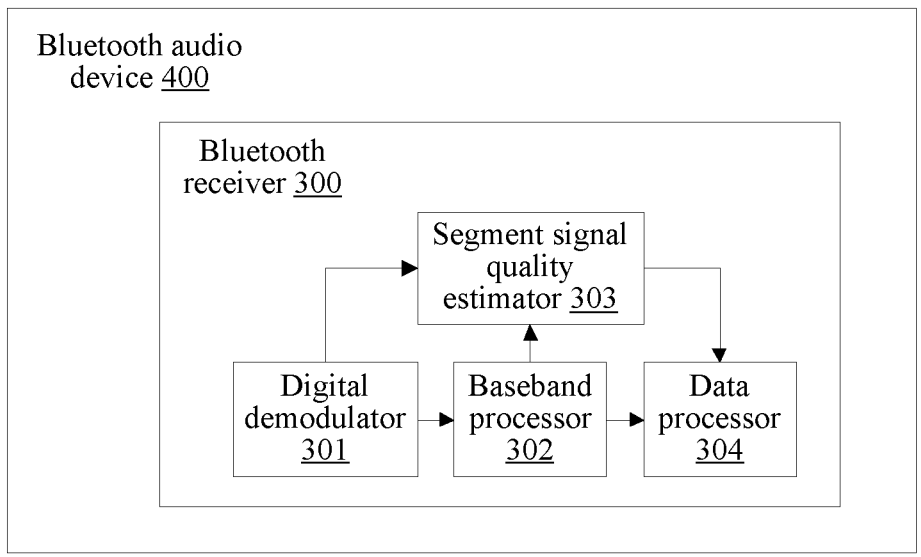
FIG. 4 is a schematic structural diagram of a Bluetooth audio device according to a third embodiment of the present invention.

Based on a same invention conception, a Bluetooth audio device is provided according to a third embodiment of the present invention. FIG. 4 is a schematic structural diagram of the Bluetooth audio device according to the third embodiment of the present invention.

As shown in FIG. 4, the Bluetooth audio device 400 according to the third embodiment of the present invention includes the Bluetooth receiver 300 shown in FIG. 3. The Bluetooth audio device according to the third embodiment of the present invention may be a Bluetooth headset, a Bluetooth speaker, an in-vehicle hands-free device, or the like.

In the Bluetooth audio device according to the third embodiment of the present invention, when the CRC result is failed and the remaining retransmission times for the load data runs out, the load data is processed based on signal quality of each of a plurality of data segments in one or more pre-stored load data having failed CRC results, to use the load data having failed CRC result and relatively good signal quality to conceal damage caused by a data loss to a voice or audio, thereby effectively improving data reliability of limited retransmission of Bluetooth and Bluetooth communication performance.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A Bluetooth receiver, comprising:
    a digital demodulator;
    a baseband processor configured to receive a baseband signal from the digital demodulator, parse out load data and cyclic redundancy check (CRC) information of the load data from the baseband signal, and perform a CRC to the load data based on the CRC information to obtain a CRC result of the load data;
    a segment signal quality estimator configured to obtain a signal angle difference before and after judgment for each of a plurality of data segments in each load data from the digital demodulator, and determine a signal quality of each of the plurality of data segments in the load data based on the signal angle difference before and after the judgment for each of the plurality of data segments during demodulation; and
    a data processor configured to obtain the load data and the CRC result of the load data from the baseband processor, and process the load data based on a signal quality of each of the plurality of data segments in one or more pre-stored load data having failed CRC results when the CRC result of the load data is failed and a remaining retransmission times for the load data is not greater than zero.

2. The Bluetooth receiver according to claim 1, wherein the data processor is further configured to transmit the load data to a protocol processor for processing the transmitted load data and to end retransmission when the CRC result of the load data is succeeded.

3. The Bluetooth receiver according to claim 1, wherein the data processor is further configured to decrease the remaining retransmission times by one and request retransmission when the CRC result of the load data is failed and the remaining retransmission times for the load data is greater than zero.

4. The Bluetooth receiver according to claim 1, wherein the segment signal quality estimator comprises:
    a division unit configured to divide the load data into N data segments each comprising M symbols based on a length of the load data, wherein M is a natural number greater than or equal to 1 and N is a natural number greater than 1;
    a first calculation unit configured to calculate a complex signal angle $\theta$ before judgment and a data angle $\hat{\theta}$ after judgment during demodulation for each symbol separately;
    a second calculation unit configured to calculate an absolute value $\Delta\theta=|\theta-\hat{\theta}|$ of a difference between the complex signal angle $\theta$ and the data angle $\hat{\theta}$ for each symbol;
    a third calculation unit configured to calculate $\overline{\Delta\theta}$ of each of the N data segments separately, wherein $\overline{\Delta\theta}$ is an average value of M $\Delta\theta$ corresponding to the M symbols in each data segment; and
    a determining unit configured to determine a signal quality of each data segment based on $\overline{\Delta\theta}$ of each data segment.

5. The Bluetooth receiver according to claim 4, wherein the determining unit is configured to determine that a signal quality of a data segment is a first state if the signal quality $\overline{\Delta\theta}$ of the data segment is less than or equal to a preset threshold, otherwise, determine that the signal quality of the data segment is a second state.

6. The Bluetooth receiver according to claim 5, wherein when there is one pre-stored load data, the data processor is configured to:
    transmit, to a protocol processor, the data segment of which the signal quality is the first state in the one pre-stored load data having failed the CRC result; and
    discard the data segment of which the signal quality is the second state in the one pre-stored load data having failed the CRC result.

7. The Bluetooth receiver according to claim 5, wherein when there is a plurality of pre-stored load data, the data processor is configured to:
    select the N data segments having minimum $\overline{\Delta\theta}$ from corresponding data segments in the pre-stored load data respectively, and combine the N data segments having the minimum $\overline{\Delta\theta}$ into one new combined load data;
    transmit, to a protocol processor, the data segment of which the signal quality is the first state in the new combined load data; and
    discard the data segment of which the signal quality is the second state in the new combined load data.

8. A Bluetooth audio device, comprising a Bluetooth receiver, the Bluetooth receiver comprising:
    a digital demodulator;
    a baseband processor configured to receive a baseband signal from the digital demodulator, parse out load data and cyclic redundancy check (CRC) information of the load data from the baseband signal, and perform a CRC to the load data based on the CRC information to obtain a CRC result of the load data;
    a segment signal quality estimator configured to obtain a signal angle difference before and after judgment for each of a plurality of data segments in each load data from the digital demodulator, and determine a signal quality of each of the plurality of data segments in the load data based on the signal angle difference before and after the judgment for each of the plurality of data segments during demodulation; and
    a data processor configured to obtain the load data and the CRC result of the load data from the baseband processor, and process the load data based on a signal quality of each of the plurality of data segments in one or more pre-stored load data having failed CRC results when the CRC result of the load data is failed and a remaining retransmission times for the load data is not greater than zero.

9. The Bluetooth audio device according to claim 8, wherein the data processor is further configured to transmit the load data to a protocol processor for processing the transmitted load data and to end retransmission when the CRC result of the load data is succeeded.

10. The Bluetooth audio device according to claim 8, wherein the data processor is further configured to decrease the remaining retransmission times by one and request retransmission when the CRC result of the load data is failed and the remaining retransmission times for the load data is greater than zero.

11. The Bluetooth audio device according to claim 8, wherein the segment signal quality estimator comprises:
   a division unit configured to divide the load data into N data segments each comprising M symbols based on a length of the load data, wherein M is a natural number greater than or equal to 1 and N is a natural number greater than 1;
   a first calculation unit configured to calculate a complex signal angle $\theta$ before judgment and a data angle $\hat{\theta}$ after judgment during demodulation for each symbol separately;
   a second calculation unit configured to calculate an absolute value $\Delta\theta=|\theta-\hat{\theta}|$ of a difference between the complex signal angle $\theta$ and the data angle $\hat{\theta}$ for each symbol;
   a third calculation unit configured to calculate $\overline{\Delta\theta}$ of each of the N data segments separately, wherein $\overline{\Delta\theta}$ is an average value of M $\Delta\theta$ corresponding to the M symbols in each data segment; and
   a determining unit configured to determine a signal quality of each data segment based on $\overline{\Delta\theta}$ of each data segment.

12. The Bluetooth audio device according to claim 11, wherein the determining unit is configured to determine that a signal quality of a data segment is a first state if the signal quality $\overline{\Delta\theta}$ of the data segment is less than or equal to a preset threshold, otherwise, determine that the signal quality of the data segment is a second state.

13. The Bluetooth audio device according to claim 12, wherein
   when there is one pre-stored load data, the data processor is configured to: transmit, to a protocol processor, the data segment of which the signal quality is the first state in the one pre-stored load data having failed the CRC result, and discard the data segment of which the signal quality is the second state in the one pre-stored load data having failed the CRC result; or
   when there is a plurality of pre-stored load data, the data processor is configured to: select the N data segments having minimum $\overline{\Delta\theta}$ from corresponding data segments in the pre-stored load data respectively, and combine the N data segments having the minimum $\overline{\Delta\theta}$ into one new combined load data; transmit, to a protocol processor, the data segment of which the signal quality is the first state in the new combined load data; and discard the data segment of which the signal quality is the second state in the new combined load data.

\* \* \* \* \*